United States Patent
Walker et al.

(10) Patent No.: US 9,352,675 B2
(45) Date of Patent: May 31, 2016

(54) BI-LEVEL HEADREST, BODY SUPPORT STRUCTURE AND METHOD OF SUPPORTING A USER'S CRANIUM

(71) Applicant: Herman Miller, Inc., Zeeland, MI (US)

(72) Inventors: Brock Walker, Okemos, MI (US); John F. Aldrich, Grandville, MI (US); Robert W. Insalaco, Holland, MI (US)

(73) Assignee: Herman Miller, Inc., Zeeland, MI (US)

( * ) Notice: Subject to any disclaimer, the term of this patent is extended or adjusted under 35 U.S.C. 154(b) by 512 days.

(21) Appl. No.: 13/623,265

(22) Filed: Sep. 20, 2012

(65) Prior Publication Data

US 2013/0069411 A1    Mar. 21, 2013

Related U.S. Application Data

(60) Provisional application No. 61/537,177, filed on Sep. 21, 2011.

(51) Int. Cl.
*A47C 1/10* (2006.01)
*B60N 2/48* (2006.01)
*A47C 7/38* (2006.01)

(52) U.S. Cl.
CPC . *B60N 2/482* (2013.01); *A47C 7/38* (2013.01); *B60N 2/485* (2013.01); *B60N 2/4864* (2013.01)

(58) Field of Classification Search
CPC ...... B60N 2/482; B60N 2/485; B60N 2/4864; A47C 7/38
USPC ............. 297/391, 400, 405, 409, 410, 284.3, 297/284.7, 284.8, 284.1
See application file for complete search history.

(56) References Cited

U.S. PATENT DOCUMENTS

| | | | |
|---|---|---|---|
| 180,548 A | 8/1876 | Chichester | |
| 233,140 A | 10/1880 | Candrian | |
| 366,514 A | 7/1887 | Scarritt et al. | |
| 392,212 A | 11/1888 | McCollum | |
| 2,102,069 A * | 12/1937 | Hanicke | 602/18 |
| 2,180,768 A * | 11/1939 | Peterson | 297/405 |
| 2,434,007 A | 1/1948 | O'Dea | |
| 2,471,024 A | 5/1949 | Cramer | |
| 2,549,902 A * | 4/1951 | Hibbard et al. | 297/284.3 |

(Continued)

FOREIGN PATENT DOCUMENTS

| | | |
|---|---|---|
| DE | 4338872 A1 | 6/1994 |
| JP | 04-279109 A | 10/1992 |

(Continued)

OTHER PUBLICATIONS

International Search Report for International Application No. PCT/US2012/056275, dated Dec. 13, 2012, 1 page.

(Continued)

*Primary Examiner* — Laurie K Cranmer
(74) *Attorney, Agent, or Firm* — Michael Best & Friedrich LLP

(57) ABSTRACT

A method of supporting a user's cranium includes directly supporting at least a portion of a first user's T1-T6 vertebrae with a primary support and directly supporting a junction between the first user's occipital bone and C1 vertebrae with a secondary support spaced from the primary support. The positions of the primary and secondary supports may be independently adjusted relative to each other. Various body support structures and headrest structures are also provided.

41 Claims, 9 Drawing Sheets

(56) References Cited

U.S. PATENT DOCUMENTS

| | | | |
|---|---|---|---|
| 2,807,313 A | 9/1957 | Kaufman | |
| 2,859,799 A | 11/1958 | Moore | |
| 2,859,801 A | 11/1958 | Moore | |
| 2,990,008 A | 6/1961 | Bien | |
| 3,017,221 A | 1/1962 | Emery | |
| 3,059,971 A * | 10/1962 | Becker | 297/353 |
| 3,224,809 A | 12/1965 | Thompson | |
| 3,226,159 A | 12/1965 | Binding | |
| 3,337,267 A | 8/1967 | Rogers, Jr. | |
| 3,540,777 A | 11/1970 | de Beaumont | |
| 3,574,397 A | 4/1971 | Norriss | |
| 3,596,655 A * | 8/1971 | Corcoran | 602/32 |
| 3,880,463 A * | 4/1975 | Shephard et al. | 297/284.7 |
| 3,989,297 A | 11/1976 | Kerstholt | |
| 4,084,850 A | 4/1978 | Ambasz | |
| 4,218,792 A | 8/1980 | Kogan | |
| 4,234,228 A | 11/1980 | Flamm | |
| 4,285,081 A | 8/1981 | Price | |
| 4,345,347 A | 8/1982 | Kantor | |
| 4,380,352 A | 4/1983 | Diffrient | |
| 4,494,261 A | 1/1985 | Morrow | |
| 4,502,729 A | 3/1985 | Locher | |
| 4,504,090 A | 3/1985 | Goldman | |
| 4,560,199 A | 12/1985 | Sapper | |
| 4,607,886 A | 8/1986 | Mazhar | |
| 4,641,884 A | 2/1987 | Miyashita et al. | |
| 4,647,066 A * | 3/1987 | Walton | 297/284.1 |
| 4,685,730 A | 8/1987 | Linguanotto | |
| 4,708,129 A | 11/1987 | Pujals, Jr. | |
| 4,709,963 A | 12/1987 | Uecker et al. | |
| 4,822,102 A | 4/1989 | Duvenkamp | |
| 4,834,454 A | 5/1989 | Dicks | |
| 4,848,837 A | 7/1989 | Völkle | |
| 4,962,962 A | 10/1990 | Machate et al. | |
| 4,968,095 A | 11/1990 | Moyer | |
| 4,978,170 A | 12/1990 | Pelz et al. | |
| 4,981,325 A * | 1/1991 | Zacharkow | 297/284.1 |
| 4,984,846 A | 1/1991 | Ekornes | |
| 5,025,518 A | 6/1991 | Summer | |
| 5,026,120 A | 6/1991 | Takeda et al. | |
| 5,058,953 A | 10/1991 | Takagi et al. | |
| 5,062,676 A | 11/1991 | Mars | |
| 5,080,435 A | 1/1992 | Desanta | |
| 5,120,109 A | 6/1992 | Rangoni | |
| 5,129,705 A | 7/1992 | Wray | |
| 5,181,763 A | 1/1993 | Dellanno et al. | |
| 5,220,700 A | 6/1993 | Liu | |
| 5,228,747 A * | 7/1993 | Greene | 297/284.3 |
| 5,249,839 A | 10/1993 | Faiks et al. | |
| 5,288,130 A * | 2/1994 | Foster | 297/411.36 |
| 5,290,091 A | 3/1994 | Dellanno et al. | |
| 5,308,144 A | 5/1994 | Korn | |
| 5,316,375 A | 5/1994 | Breen | |
| 5,328,245 A * | 7/1994 | Marks et al. | 297/284.3 |
| 5,332,287 A * | 7/1994 | Whitmyer | 297/405 |
| 5,344,211 A | 9/1994 | Adat et al. | |
| 5,354,120 A | 10/1994 | Völkle | |
| 5,366,274 A | 11/1994 | Roericht et al. | |
| 5,370,443 A | 12/1994 | Maruyamn | |
| 5,385,388 A | 1/1995 | Faiks et al. | |
| 5,447,356 A * | 9/1995 | Snijders | 297/284.3 |
| 5,472,261 A | 12/1995 | Oplenskdal et al. | |
| 5,501,507 A | 3/1996 | Hummitzsch | |
| 5,547,252 A | 8/1996 | Pfenniger | |
| 5,564,788 A | 10/1996 | Warhaftig | |
| 5,580,124 A | 12/1996 | Dellanno | |
| 5,597,203 A | 1/1997 | Hubbard | |
| 5,612,718 A | 3/1997 | Bryan | |
| 5,622,405 A | 4/1997 | Pitencel | |
| 5,636,898 A | 6/1997 | Dixon et al. | |
| 5,704,689 A | 1/1998 | Kim | |
| 5,707,108 A * | 1/1998 | Pi | 297/230.14 |
| 5,778,469 A | 7/1998 | Festa | |
| 5,868,467 A | 2/1999 | Moll | |
| 5,871,258 A | 2/1999 | Battey et al. | |
| 5,909,923 A | 6/1999 | DeKraker | |
| 5,926,880 A | 7/1999 | Sramek | |
| 5,979,984 A | 11/1999 | DeKraker et al. | |
| 6,056,361 A | 5/2000 | Cvek | |
| 6,086,153 A | 7/2000 | Heidmann et al. | |
| 6,095,611 A | 8/2000 | Bar et al. | |
| 6,125,851 A | 10/2000 | Walker et al. | |
| 6,158,812 A * | 12/2000 | Bonke | 297/391 |
| 6,412,869 B1 | 7/2002 | Pearce | |
| 6,435,617 B1 | 8/2002 | McNair | |
| 6,523,898 B1 | 2/2003 | Ball et al. | |
| 6,532,962 B1 | 3/2003 | Walker et al. | |
| 6,626,494 B2 * | 9/2003 | Yoo | 297/296 |
| 6,786,554 B1 | 9/2004 | Zahiri | |
| 6,969,114 B2 * | 11/2005 | Keilhauer | 297/230.1 |
| 7,331,631 B1 | 2/2008 | Yeh | |
| 7,429,080 B2 * | 9/2008 | Walker et al. | 297/284.4 |
| 7,445,008 B1 | 11/2008 | Walker | |
| 7,537,286 B2 | 5/2009 | Walker et al. | |
| 7,967,379 B2 * | 6/2011 | Walters et al. | 297/284.3 |
| D672,172 S | 12/2012 | Walker | |
| 2001/0054836 A1 * | 12/2001 | Vik | 297/284.8 |
| 2004/0256899 A1 * | 12/2004 | Moore et al. | 297/284.3 |
| 2006/0238006 A1 * | 10/2006 | Baranov et al. | 297/284.3 |
| 2008/0116730 A1 * | 5/2008 | Connolly et al. | 297/284.4 |
| 2009/0058161 A1 | 3/2009 | Meert | |
| 2009/0079250 A1 | 3/2009 | Follesa et al. | |
| 2009/0211032 A1 | 8/2009 | Lange | |
| 2010/0072795 A1 | 3/2010 | Meixner et al. | |
| 2010/0133888 A1 | 6/2010 | Montuore | |
| 2010/0164266 A1 | 7/2010 | Walters et al. | |
| 2010/0181811 A1 | 7/2010 | Bonne | |
| 2010/0237677 A1 | 9/2010 | Nam | |
| 2010/0253125 A1 | 10/2010 | Le Texier et al. | |

FOREIGN PATENT DOCUMENTS

| | | |
|---|---|---|
| WO | WO 89/06101 A1 | 7/1989 |
| WO | WO 2005/009782 A1 | 2/2005 |

OTHER PUBLICATIONS

Written Opinion of the International Searching Authority for International Application No. PCT/US2012/056275, dated Dec. 13, 2012, 9 pages.

* cited by examiner

BI-LEVEL HEADREST, BODY SUPPORT STRUCTURE AND METHOD OF SUPPORTING A USER'S CRANIUM

This application claims the benefit of U.S. Provisional Application Ser. No. 61/537,177, filed Sep. 21, 2011 and entitled Bi-Level Headrest, Body Support Structure and Method of Supporting a User's Cranium, the entire disclosure of which is hereby incorporated herein by reference.

FIELD OF THE INVENTION

The present invention relates generally to a headrest for a body support structure, and in particular, to a bi-level headrest supporting the anatomical structures that support the cranium and methods for the user thereof.

BACKGROUND

It is well known to provide headrests to support the head of a user, for example in automotive seating, office seating, airline seating and the like. Often, headrests are designed to support the weight of the cranium by providing a structure and surface that provides a safe and comfortable platform for resting the cranium. Generally, the headrest is anchored to a frame or other support structure and may have an element of adjustability to meet anthropometric, comfort and safety standards. For example, in some applications, the headrest may be adjustable in up-down and/or fore-aft directions to provide a better fit for a particular user. Typically, headrests function only to support the cranium, either on the occipital bone and/or in the cervical region of the spine. Such devices therefore fail to support adjacent anatomical structure below the cervical region, which would enable the user to leverage such structure and thereby achieve better control over the cranium. Accordingly, the need remains for an improved headrest that provides additional support for the anatomical structures supporting the cranium.

SUMMARY

The present invention is defined by the following claims, and nothing in this section should be considered to be a limitation on those claims.

In one aspect, one embodiment of a method of supporting a user's cranium includes directly supporting at least a portion of a first user's T1-T6 vertebrae with a primary support, wherein a spine of the first user defines a longitudinal direction when supported by the primary support. The method further includes directly supporting a junction between the first user's occipital bone and C1 vertebrae with a secondary support spaced from the primary support along a longitudinal axis extending in the longitudinal direction, adjusting a position of the secondary support along the longitudinal axis, and adjusting a position of the primary support along the longitudinal axis relative to the position of the secondary support independent of the adjusting of the position of the secondary support.

In another aspect, the method also includes directly supporting at least a portion of a second user's T1-T6 vertebrae with the primary support and directly supporting a junction between the first user's occipital bone and C1 vertebrae with the secondary support.

In another embodiment, a method of supporting a user's cranium includes adjusting a position of the secondary support in a fore and aft direction transverse to the longitudinal axis and adjusting a position of the primary support in the fore and aft direction transverse to the longitudinal axis independent of adjusting the position of the secondary support.

In another aspect, one embodiment of a bi-level headrest includes a support structure and primary and secondary headrest supports coupled to the support structure. The primary headrest support includes a primary support surface defining a centerline of the primary headrest support. The primary headrest support is positionable along at least a portion of a T1-T6 thoracic region of a user, with the centerline extending in a longitudinal direction. The secondary headrest support includes a secondary support surface spaced apart from the primary support surface along the longitudinal direction. The secondary headrest support is positionable at an occipital shelf region of the user, wherein both of the primary and secondary headrest supports are independently moveable relative to the other thereof along the longitudinal direction.

In another embodiment, either or both of the primary and secondary headrest supports are independently moveable relative to the other thereof along a fore and aft direction extending transverse to the longitudinal direction. In other embodiments, either or both of the primary and secondary headrest supports are independently pivotable about one or both of a laterally extending axis or a fore-aft axis.

In yet another aspect, one embodiment of a body support structure includes a backrest member having a support surface shaped and configured to support at least a sacral region of a user's back. The primary and secondary supports are independently moveable relative to the backrest member along a centerline thereof.

The various embodiments of the headrest and body support structure, and methods of use thereof, provide significant advantages over other such structures and methods. For example and without limitation, the primary support provides independent support to control and manage the anatomical region (in the T1-T6 region) adjacent to the cervical region. In this way, it is easier for the user to transfer the weight of their cranium throughout postural changes in various directions by providing strength and leverage through the primary support. At the same time, the device provides multiple support sites, together with a load distribution system, that spreads the load and defuses any hard contact points. In essence, the device supports the unified anatomical triangle created by the upper torso, cervical spine and cranium, and avoids using the cervical or cranial anatomy as the primary support site for the cranium. Instead, by supporting the cranium's adjacent anatomy, the user can use the leverage from the primary support to efficiently handle the transfer of the cranial weight. In addition, the device provides adjustability of both support sites in a plurality of directions such that the sites can be properly positioned to accommodate various users with different anatomical make-ups and dimensions.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "longitudinal," as used herein means of or relating to length or the lengthwise direction, e.g., a longitudinal axis 2 extending along the length of the spine of the user. The term "lateral," as used herein, means directed between or toward (or perpendicular to) the sides of a body support structure, e.g., a lateral direction 4. The term "coupled" means connected to or engaged with, whether directly or indirectly, for example with an intervening member, and does not require the engagement to be fixed or permanent, although it may be fixed or permanent. The term "transverse" means extending across an axis or surface, including but not limited to substantially perpendicular to the axis or surface. It should be understood that the use of numerical terms "first," "second," "third," etc., as used herein does not refer to any particular sequence or order of components (e.g., consecutive); for example "first" and "second" support members may refer to any sequence of such support members, and is not limited to the first and second support members of a particular configuration unless otherwise specified.

Figure 1:
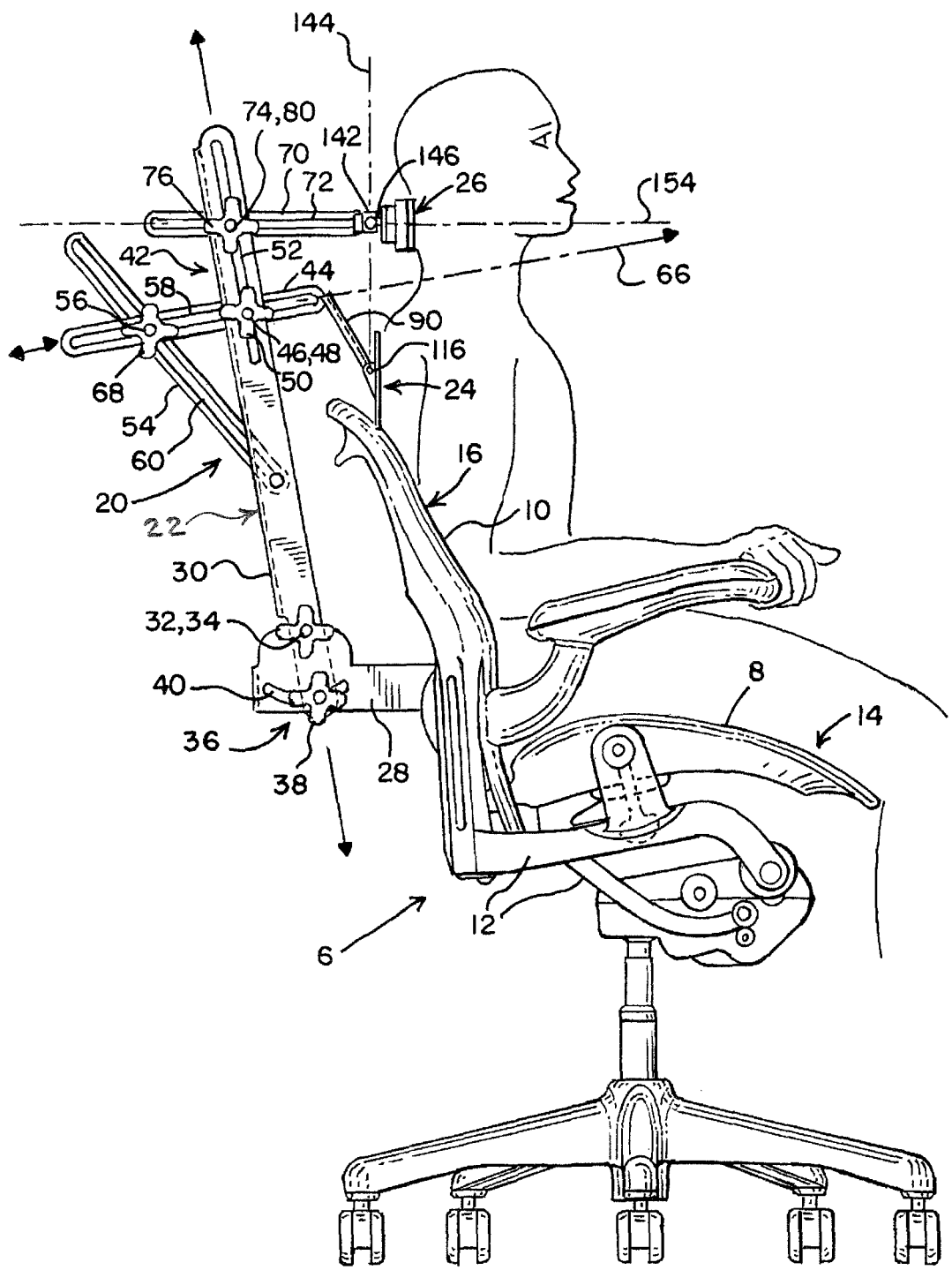
FIG. 1 is a side view of one embodiment of a body support structure including a bi-level headrest.
Figure 11:
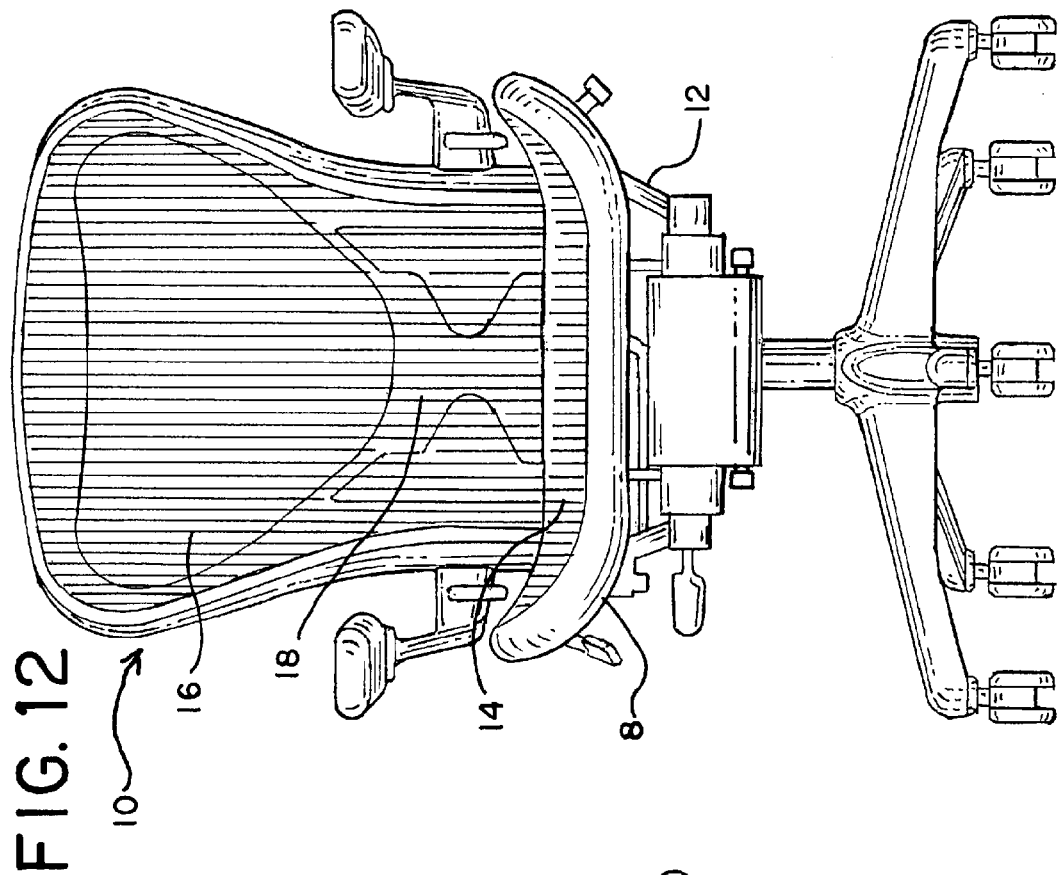
FIG. 11 is a front view of a body support structure including a bi-level headrest.

Referring to FIG. 1, a body support structure 6 configured as an office chair is shown. It should be understood that other body support structures may include without limitation airline, automotive, rail, marine and other types of seating, as well as various home and outdoor seating. The body support structure may also be configured to support the body of a user in a standing or lying in a supine or prone position. In one embodiment, the body support structure 6 includes a seat 8 and a backrest 10, both coupled to a base, for example with a linkage 12, such that the seat and backrest are pivotable relative to the base and to each other. Both the seat 8 and backrest 10 have user interface body support surfaces 14, 16 as shown in FIGS. 1 and 11. As shown in FIG. 1, one suitable embodiment of a body support structure is an AERON office chair available from Herman Miller, Inc., Zeeland, Mich. The seat, and in particular the support surface 14, supports the buttock and thighs of the user, while the backrest, including the support surface 16, supports the back of the user.

Figure 12:
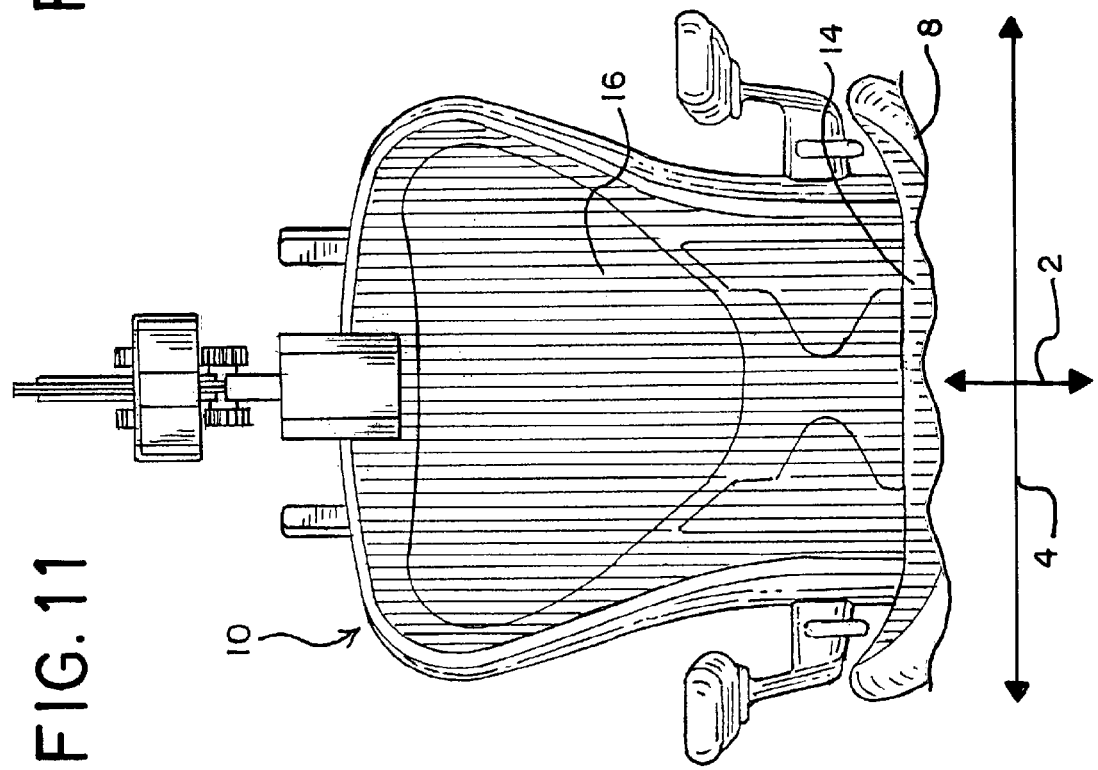
FIG. 12 is a front view of a body support structure configured with a sacral support.

In one embodiment, shown in FIG. 12, the body support structure 6 is provided with one or both of a sacral support 18 and/or lumbar support, which provide further support to the back of the user at the sacral and lumbar regions thereof. For example, a POSTUREFIT support is available from Herman Miller, Inc., Zeeland, Mich.

Figure 2:
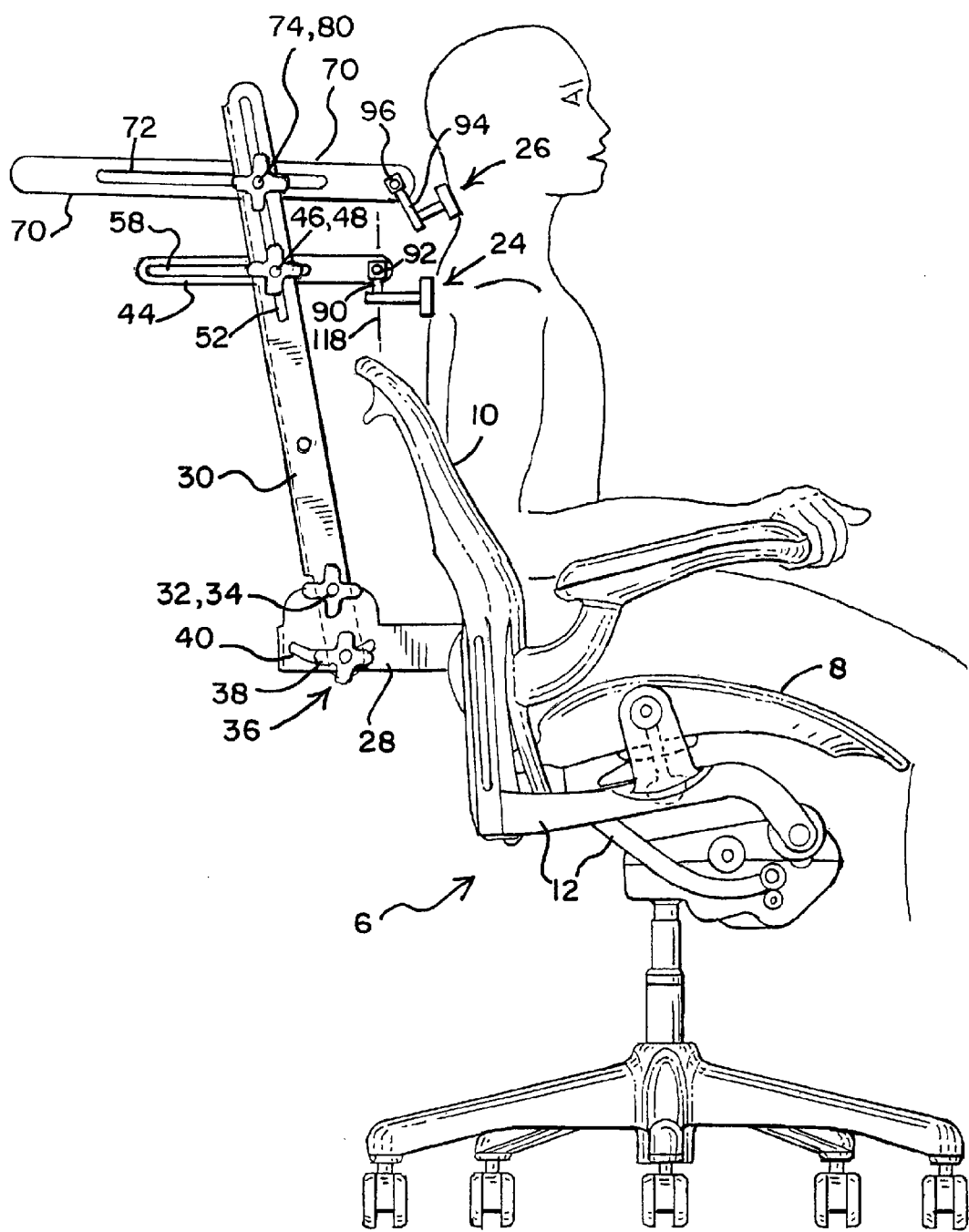
FIG. 2 is a side view of the body support structure of FIG. 1 with an alternative embodiment of the bi-level headrest.

Referring to FIGS. 1 and 2, a bi-level headrest 20 includes a support structure 22 and primary and secondary headrest supports 24, 26 coupled to the support structure. In one embodiment, the support structure 22 includes a base support 28 secured to the backrest 10, for example to the frame of the backrest. A central spine member 30 is pivotally coupled to the base with a pin 32 about a horizontal pivot axis 34. The spine member 30 is pivotable toward and away from the backrest 10 about the axis 34, and may be secured in an infinite number of positions with a lock member 36, shown as a grippable and rotatable handle 38 that includes a shaft sliding along a curved slot 40 formed in the base 28, with the slot 40 curving about the pivot axis 34. In one position, the spine 30 may be oriented so as to be substantially parallel to the longitudinal axis 2. At an upper end 42 of the spine member, a first support arm 44 is pivotally coupled to the spine with a pin 46 about a horizontal pivot axis 48. The support arm 44 is also moveable along a portion of a length of the spine 30, for example by loosening and tightening a lock member 50 that slides within a longitudinal slot 52 formed in the spine 30. In this way, the support arm 44 may be adjusted, e.g., translated, along the longitudinal axis of the spine, e.g., up and down in this embodiment, relative to the backrest and seat of the body support structure.

Referring to FIG. 1, a brace 54 is pivotally coupled to the spine 30 and supports the support arm at a location 56 spaced from the pivot axis 48. Alternatively, as shown in FIG. 2, the brace member may be omitted. Both the support arm 44 and brace 54 include longitudinal slots 58, 60, such that the support arm 44 can be moved transverse (along axis 66) to the spine as the pin 46 slides along the longitudinal slot 58, and also rotated about the axis 48 as the brace member 54 is pivoted and slid relative to the support arm 44. Once the desired position of the support arm 44 is achieved, both by pivoting about the axis 48, moving (translating) longitudinally along the spine 30 and moving (translating) fore and aft along axis 66, the various lock devices 38, 50 and 68 may be tightened to secure the support arm 44 in the desired position. It should be understood that the lock devices may be configured as cam devices, threadable devices, etc.

A second support arm 70 is pivotally coupled to the spine 30 with a pin 74 about a second horizontal pivot axis 80 spaced from the first pivot axis 48. The support arm 70 is also moveable along a portion of a length of the spine 30, for example by loosening and tightening a lock member 76 that slides within the longitudinal slot 52 formed in the spine 30. In this way, the support arm 70 may be adjusted along the longitudinal axis of the spine 30, e.g, up and down in this embodiment, relative to the backrest 10 and seat 8 of the body support structure, and also relative to the first support member 24. The support arm 70 includes a longitudinal slot 72, such that the support arm can be moved transverse to the spine 30 as the pin 74 slides along the longitudinal slot 72, and also rotated about the axis 80. If needed, a second brace member may be coupled to the support arm in the same fashion as with the first support arm. Once the desired position of the support arm 70 is achieved, both by pivoting about the axis, moving (translating) longitudinally along the spine and moving (translating) fore and aft, the various lock devices 76 may be tightened to secure the support arm 70 in the desired position.

A link member 90 extends forwardly and downwardly from the support arm 44, and may be fixedly connected to an end of the support arm, or pivotally coupled thereto about a pivot axis 92. Of course, the link may be integrally formed with the support arm in one embodiment, or omitted altogether. A link member 94, as shown in FIG. 2, may also be coupled to the end of the second support arm 70, and may be pivotable about axis 96 or fixedly connected thereto.

Figure 9:
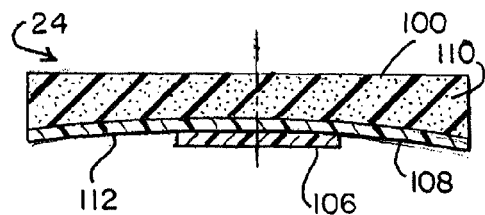
FIG. 9 is a cross-sectional view of the primary headrest support shown in FIG. 8 taken along line 9-9.

Referring to FIGS. 1-8, a primary headrest support 24 includes a primary support surface 100 defining a centerline 102 of the primary headrest support. The primary headrest support 24 is positionable along at least a portion of a T1-T6 thoracic region 130 of a user, with the centerline 102 extending in a longitudinal direction, parallel to axis 2 in some embodiments. In one embodiment, the primary headrest support extends along the T1-T5 region, while in another, the support extends along the T1-T4 region. The primary headrest support 24 includes a central region 101 and laterally spaced side regions 104. In one embodiment, the side regions 104 are more flexible than the central region 101. In one embodiment, shown in FIGS. 8 and 9, the support includes at least three layers 106, 108, 110, a rigid plastic base layer 106 extending along and defining the central region 101, a wider flexible plastic layer 108 connected to the base and extending laterally outwardly to define the side regions 104, and a foam interface layer 110 coupled the intermediate plastic layer. In one embodiment, the foam has a thickness of about ½ inch. In one embodiment, the base layer 106, or central region 101, is about 1.5 inches wide, while the intermediate layer is about 4.5 inches wide, with each side region 104 therefore being about 1.5 inches wide. In one embodiment, the height of the support is about 4.5 inches. Of course, it should be understood that other widths and heights may be suitable.

Figure 7:
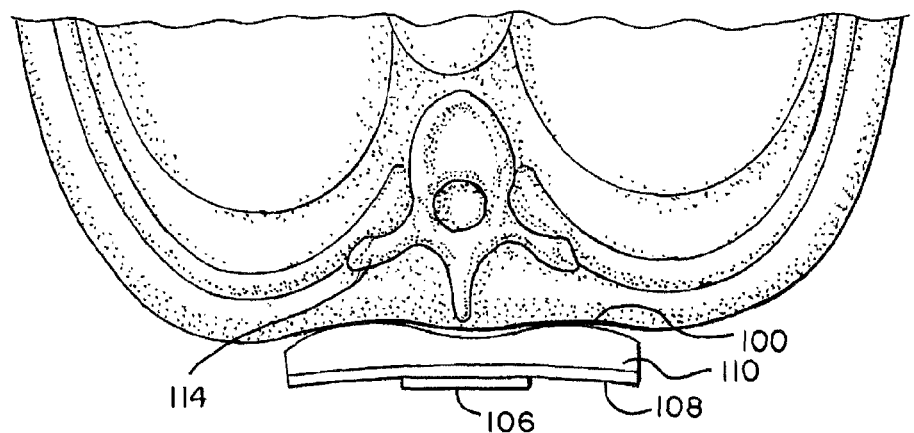
FIG. 7 is a cross-sectional view showing a primary headrest support interfacing with a spinal cord.
Figure 8:
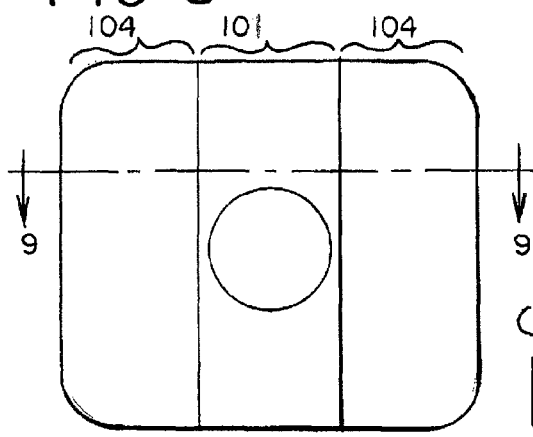
FIG. 8 is a rear view a primary headrest support.

The intermediate layer 108, and in some embodiments the foam layer, may have a slightly concave rear surface 112, and a corresponding convex front surface. As shown in FIG. 7, when engaged by the back of the user, and the spinal area 114 in particular, the foam 110 may compress to form fit with the back of the user, with the side regions 104 further flexing as necessary. Referring to FIG. 1, the support member 24 is pivotally connected to the link member about a laterally extending horizontal axis 116. The support member may also be pivotally connected about a longitudinal, or vertical axis 118, as shown in FIG. 2 whether by way of a ball joint 124 (FIG. 5) or other suitable coupling.

Figure 10:
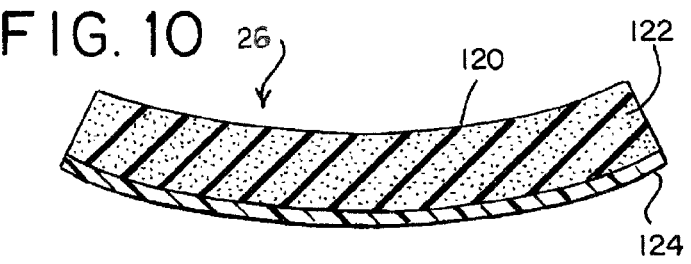
FIG. 10 is a cross-sectional view of a secondary headrest support.
Figure 13:
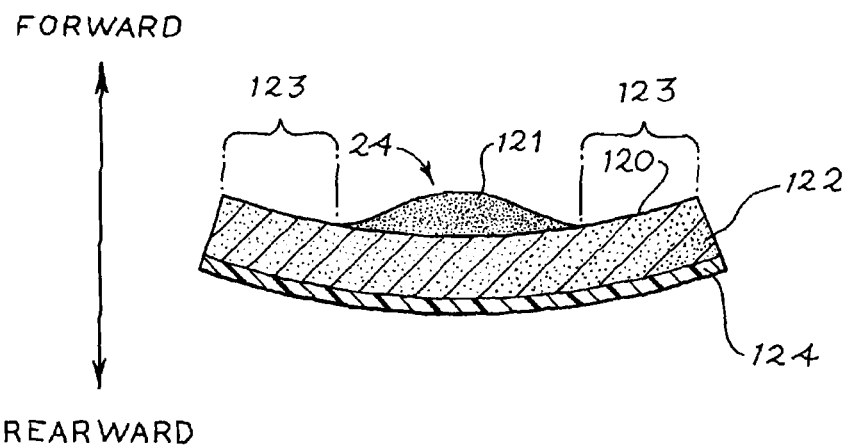
FIG. 13 is a cross-sectional view of a secondary headrest support.
Figure 14:
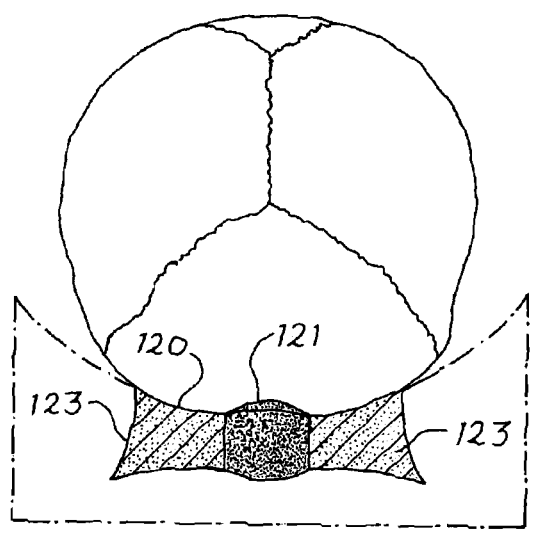
FIG. 14 is a cross-sectional view of a secondary headrest support.'
Figure 15:
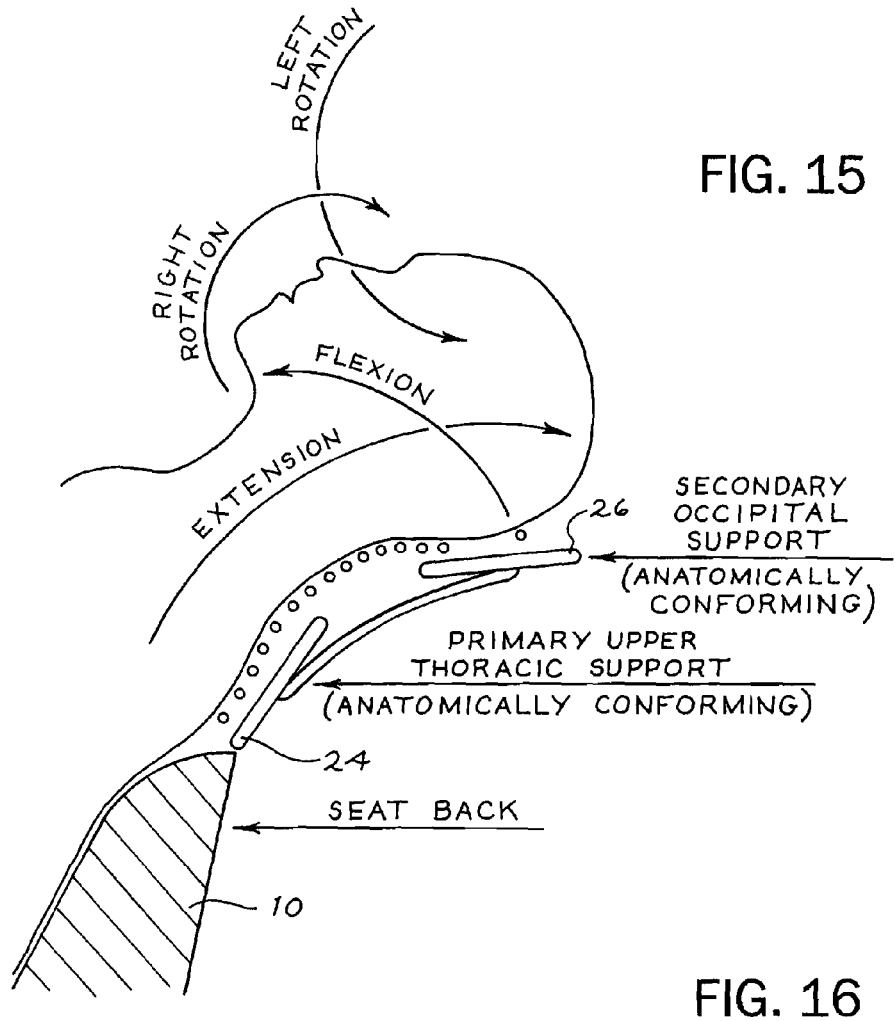
FIG. 15 is a side view of a schematic showing a primary and secondary support supporting a user.
Figure 16:
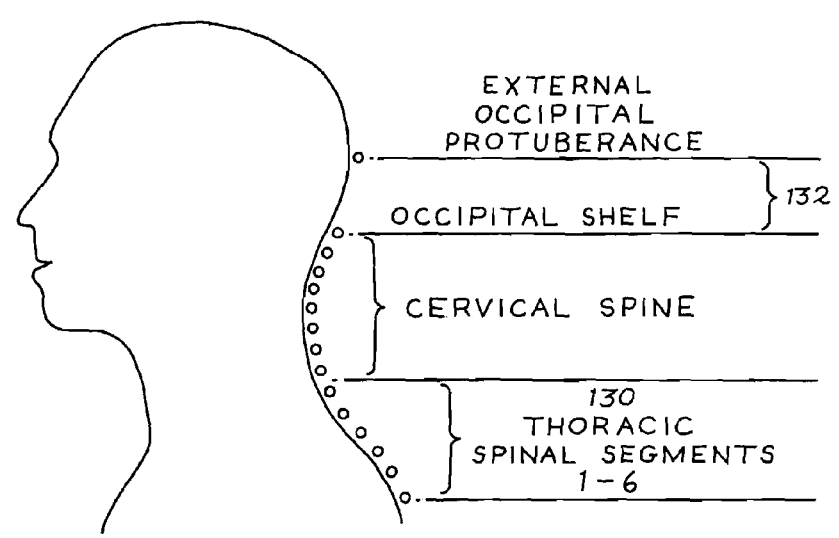
FIG. 16 is a side view showing various anatomical regions of the user.

The secondary headrest support 26 includes a secondary support surface 120 spaced apart from the primary support surface 100 along the longitudinal direction 2. The secondary headrest support 26 is positionable at an occipital shelf region 132 of the user, or junction of the occipital bone and C1 vertebrae, or C1-C1 vertebral complex, which includes the C1 vertebra and the anatomy located directly above and below the C1 vertebra. As shown in FIG. 10, the secondary support may have a forwardly facing concave surface 120, or convex rear surface, with a layer of foam 122 coupled to a layer of relatively rigid plastic 124. The foam may have a thickness of about ½ inches. The secondary support may be configured in various shapes when viewed from the front, including an oval, elliptical, circular, rectangular, polygonal shapes, etc. In one embodiment, shown in FIGS. 13 and 14, the secondary support may have a forwardly extending or projecting central region 121 and laterally spaced side regions 123, with the side regions being more flexible than the central region in one embodiment. In this embodiment, the central region 121 may have a forwardly facing convex surface, with the side regions 123 having a forwardly facing concave surface. In this way, the secondary support may have the same substrate characteristics and configuration as the primary support which provides for centerline support of the cranium-occiput structure. In one embodiment, the side regions may be omitted altogether, with just a central region providing occipital support.

Referring to FIG. 1, the support member 26 is pivotally connected to the support member 70 about a laterally extending horizontal axis 142. The support member may also be pivotally connected about a longitudinal, or vertical axis 144 by way of a ball joint 146 or other suitable coupling.

In the various embodiments, either or both of the primary and secondary headrest supports 24, 26 are independently moveable relative to the other thereof along the longitudinal direction 2 and/or a fore and aft direction 136 extending transverse to the longitudinal direction 2. In other embodiments, either or both of the primary and secondary headrest supports 24, 26 are independently pivotable about one or more of a laterally extending axes 34, 48, 80, 116, 142, a fore-aft axis 136, 66, 154, or a longitudinal (e.g., vertical) axis 118, 144. The primary and secondary supports 24, 26 also are independently moveable relative to the backrest member 10 along a centerline 102 thereof.

Figure 3:
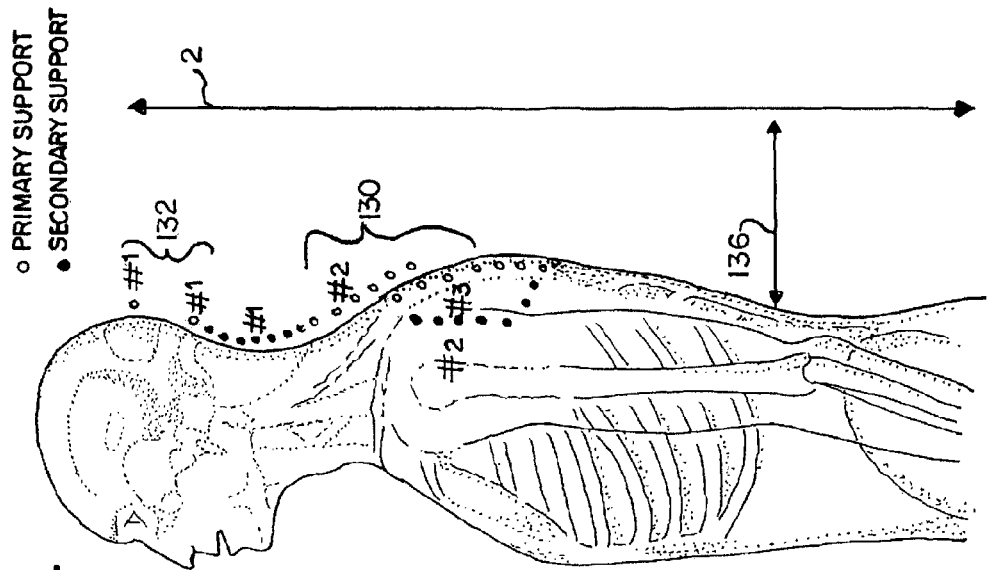
FIG. 3 is a rear view of a skeleton with overlying support regions.
Figure 4:
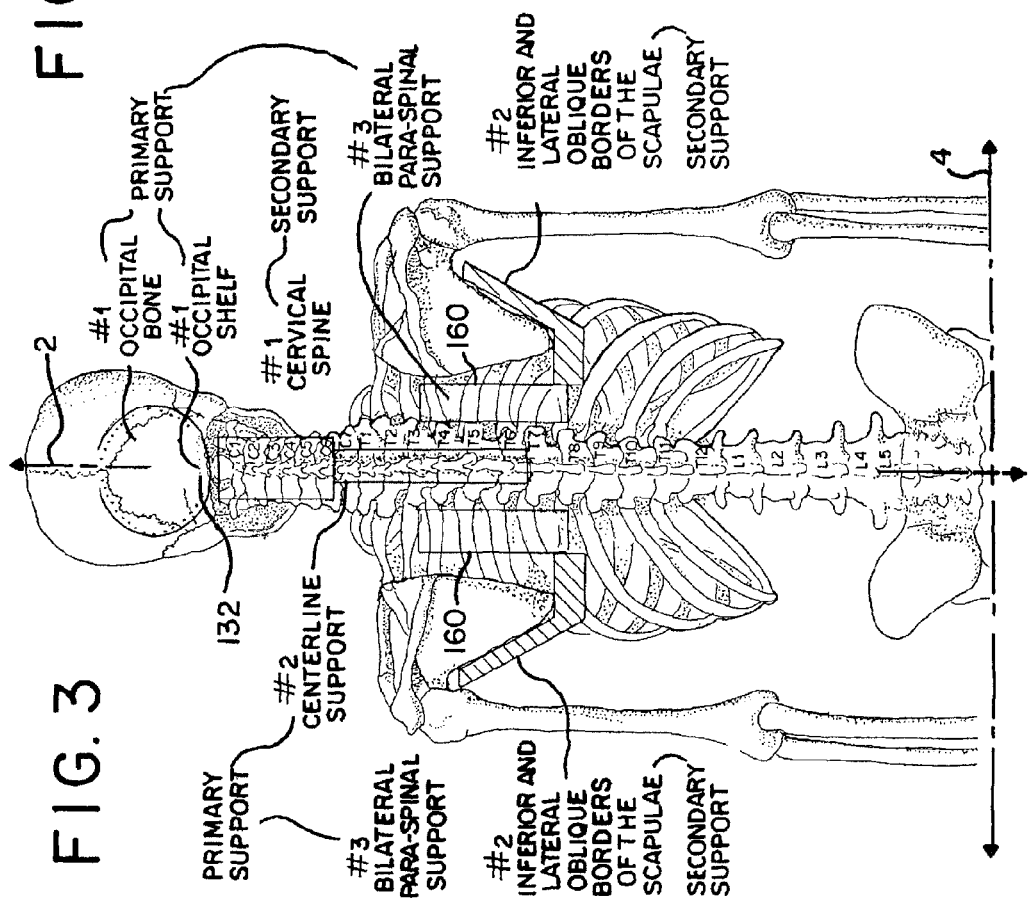
FIG. 4 is a side view of the skeleton and support regions shown in FIG. 3.
Figure 5:
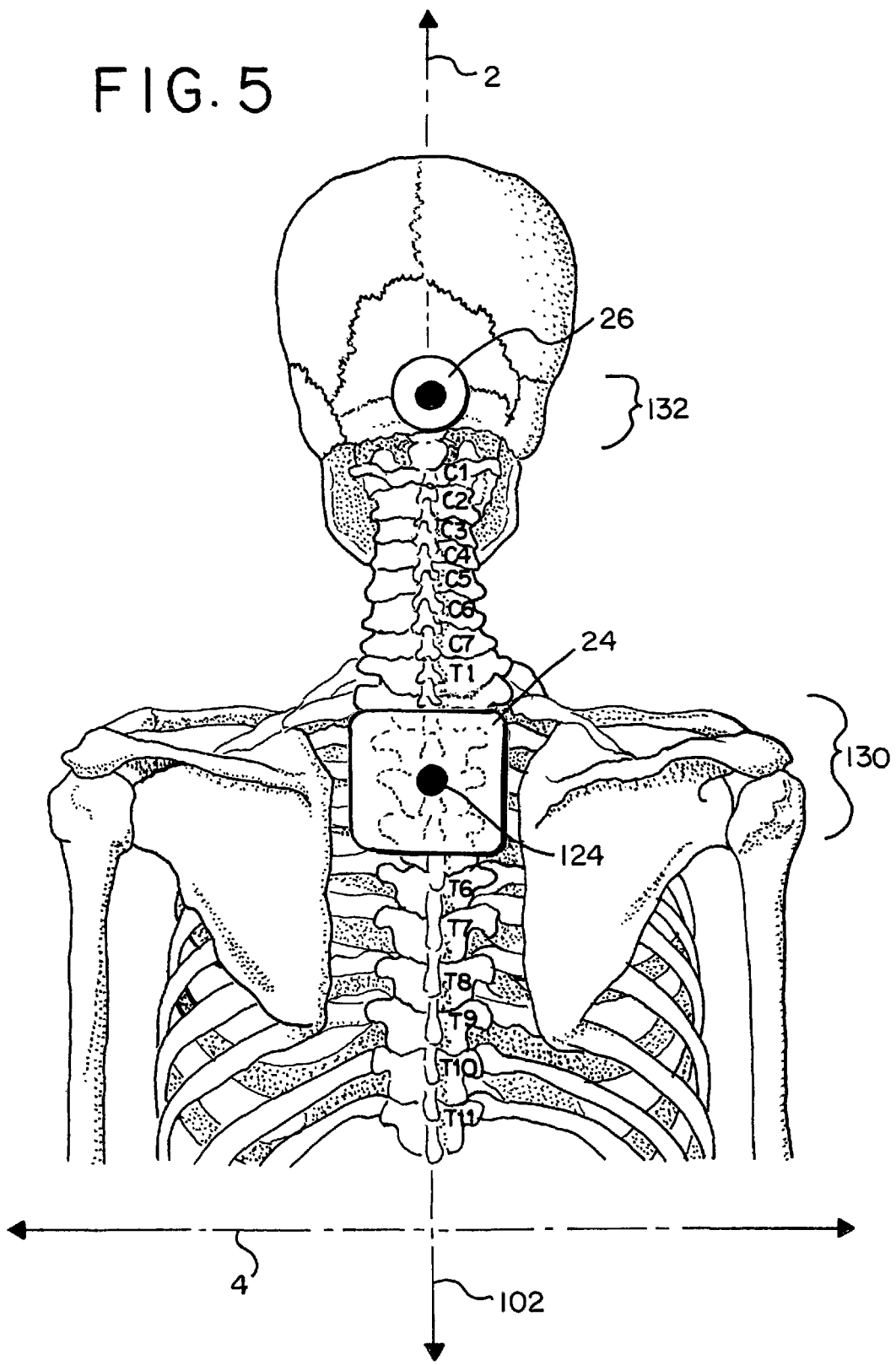
FIG. 5 is a rear view of a skeleton with overlying support surfaces from a bi-level headrest.
Figure 6:
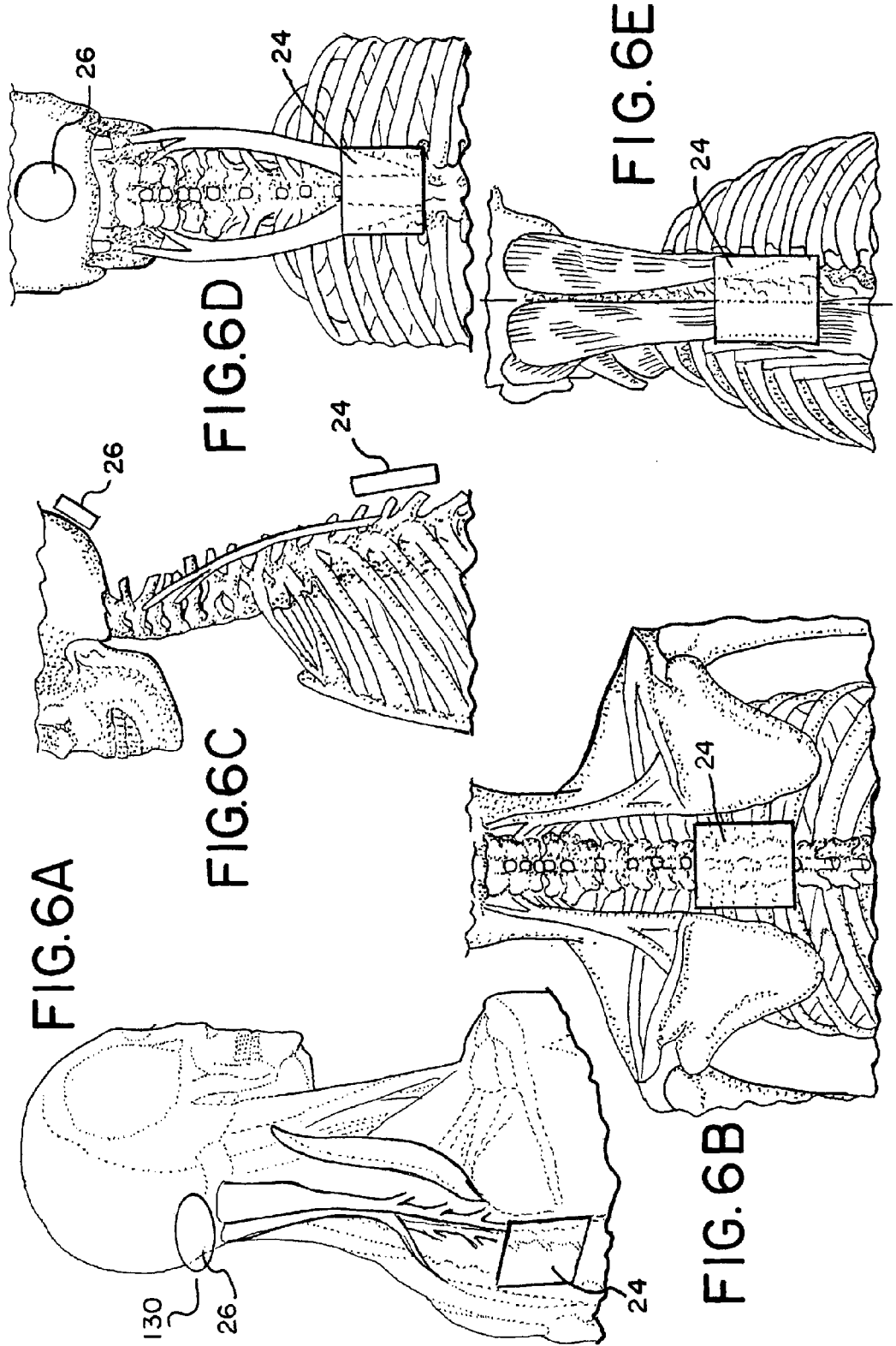
FIGS. 6A-E are various views of a human anatomical structure with overlying support surfaces from a bi-level headrest.

As shown in FIG. 3, a tertiary support member 160 is provided to support a back of said user on opposite sides of the user's T4-T8 region, and in one embodiment, one opposite sides of the T6-T8 vertebrae region. The tertiary support 160 may be coupled to the primary support 24, or independently coupled to the support structure 20 or body support structure 6.

Multidirectional movement of the head (cranium) relies on the execution of a coordinated, interconnected and interdependent muscular-skeletal system. Moving the substantial weight of the cranium (generally acknowledged to weigh 8-13 lbs for an adult) relies upon this complex and intricate anatomical construct working together as a system to create the capability for multidirectional movement of the cranium. The anatomical system that moves the cranium is a linked system that includes muscles with origins and insertions embedded in the upper thoracic, cervical and occipital regions of anatomy. For example, the occipital bone (located at the rearward base of the skull) connects to the thoracic spine (the upper back) through a series of seven cervical vertebral segments and interconnected muscles, ligaments and tendons throughout all three regions. The upper thoracic region 130 is the primary load bearing structure (foundation) for cervical and cranial behavior. By providing a primary support 24 and stabilization in the upper thoracic region 130, and by all three regions of anatomy synchronously working together, mechanical advantages of leverage are achieved. As such, the primary support 24 provides a load bearing foundation located in the upper thoracic region which improves the biomechanical leverage in order to more efficiently support and move the cranium.

As the primary support location 130 is properly supported, stabilized and loaded, cranial movement is put in motion as tension and forces of the soft tissue contract and extend around the bony spinal and skeletal structures. As a result of providing targeted support for the upper thoracic region 130, the primary support 24 improves the user's anatomical performance by way of providing the user with the ability to more efficiently move the cranium in different ways, e.g., through rotation, flexion/extension and lateral bending.

In order to move the cranium, opposing muscle groups throughout the aforementioned regions, contract and extend generating changes in the spinal curvature. This synchronized event controls the direction and degree of multi axis motion as well as engendering structural balance. As a result, the primary and secondary support 24, 26 placement reduces and/or facilitates the user's physical effort to move the cranium caused by demanding anatomical forces that are generated by compensating opposing muscle groups during postural changes (for any reason) or at rest.

The muscular-skeletal group of the head, neck and upper back are most directly influenced by a change in posture. In the upright posture, the head is more evenly balanced on the top of the vertebral column, so less muscle force is directed towards the spinal segments, muscles, ligaments and tendons. But during transitional posture changes, increased forces are required to move the weight of the cranium; movements such as flexion, extension and rotation; with the primary and secondary supports 24, 26 providing an improved method to ease the load of those forces throughout postural changes. As a result of successfully executing primary support in the upper thoracic region and followed by secondary support for the muscular-skeletal components in the cervical and occipital region, the user attains increased strength and biomechanical performance during cranial movement throughout all postural changes. In this way, a method is disclosed for providing anatomical support and leverage for the linked system. By first executing primary support and stabilization for the upper thoracic region 130, the cervical and occipital anatomy 132 realizes a more solid foundation from which to function.

In operation, a user positions themselves in the body support structure 6 and considers the positioning and comfort of the headrest 10. The user (either positioned in the body support structure or after removing themselves therefrom to allow better access to the adjustment components) or an operator then independently adjusts the position(s) of the primary and secondary supports 24, 26. In particular, the user/operator may adjust the position of the primary support 24 such that the primary support is directly supporting at least a portion of a first user's T1-T6 vertebrae region 130 when positioned in the body support structure. The user may also independently adjust the secondary support 26 such that the secondary support is directly supporting a junction between the first user's occipital bone and C1 vertebrae region 132.

The primary and secondary supports 24, 26 may adjusted by independently moving (e.g., translating) one or both of the primary and secondary supports along the longitudinal direction 2 of the user's spine, or longitudinal axis of the spine support 30, by independently pivoting one or both of the primary and secondary supports 24, 26 about one or more laterally extending horizontal axes 34, 48, 80, 116, 142, by independently moving (e.g., translating) one or both of the primary and secondary supports 2, 4 in a fore and aft direction along an axis 136, 66, 154, by pivoting/rotating one or both of the primary and secondary supports about a vertical axis 92,144, and/or by independently rotating one or both of the primary and secondary supports about a fore-aft axis 136, 66, 154 lying substantially perpendicular to the laterally extending axis. If another user desires to use the body support structure, the primary and secondary supports 24, 26 may be independently adjustable to accommodate the other user, including directly supporting at least a portion of a second user's T1-T6 vertebrae region 130 with the primary support 24 and directly supporting a junction between the first user's occipital bone and C1 vertebrae region 132 with the secondary support 26. Subsequent users may similarly be supported through various adjustments. During these various operations, the user's buttock and thighs may be supported by the seat 8, and the user's sacrum supported by a sacral support 18, with the primary and secondary supports 24, 26 independently moveable relative to each other and each of the seat 8, sacral support 18, and backrest 10 through the various manipulations herein described.

When properly positioned, the primary support 24 provides independent support to control and manage the anatomical region (in the T1-T6 region 130) adjacent to the cervical region of the user. In this way, the user may be able to transfer the weight of their cranium throughout postural changes in various directions by providing strength and leverage through the primary support at least a portion of the T1-T6 region. At the same time, the device provides multiple support sites, including the primary and secondary support locations, together with a load distribution system, that spreads the load and defuses any hard contact points. In essence, the device supports the unified anatomical triangle created by the upper torso, cervical spine and cranium, and avoids using the cervical or cranial anatomy as the primary support site for the cranium. Instead, by supporting the cranium's adjacent anatomy at the T1-T6 region 130, the user can use the leverage from the primary support 24 to efficiently handle the transfer of the cranial weight. In addition, the device provides adjustability of both support sites in a plurality of directions such that the sites can be properly positioned to accommodate various users with different anatomical make-ups and dimensions.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A method of supporting a user's cranium, the user having an occipital bone and a pair of scapulae, the method comprising:
    adjusting a position of a secondary support along a longitudinal axis, the secondary support including a secondary support surface having a surface area smaller than the user's occipital bone;
    adjusting a position of a primary support along said longitudinal axis relative to said position of said secondary support independent of said adjusting said position of said secondary support, the primary support including a primary support surface having a width smaller than a spacing between the user's scapulae;
    directly supporting at least a portion of a user's T1-T6 vertebrae with said primary support surface, wherein a spine of said user defines a longitudinal direction when supported by said primary support; and
    directly supporting a junction at or between said user's occipital bone and C1 vertebrae with said secondary support surface spaced from said primary support along a longitudinal axis extending in said longitudinal direction.

2. The method of claim 1 further comprising readjusting said position of said secondary support along said longitudinal axis and readjusting said position of said primary support along said longitudinal axis relative to said position of said secondary support independent of said readjusting said position of said secondary support.

3. The method of claim 1 wherein said directly supporting said at least said portions of said user's T1-T6 vertebrae comprises directly supporting at least said user's T1-T4 vertebrae.

4. The method of claim 1 further comprising supporting a back of said user on opposite sides of said user's T6-T8 vertebrae.

5. The method of claim 1 further comprising supporting a sacrum of said user with a backrest.

6. The method of claim 1 further comprising supporting said user's buttock and thighs with a seat member, and wherein said adjusting said positions of said primary and secondary supports comprises independently adjusting a position of both of said primary and secondary supports relative to said seat member along said longitudinal direction.

7. The method of claim 1 further comprising supporting said user's back with a backrest, and wherein said adjusting said positions of said primary and secondary supports comprises independently adjusting a position of both of said primary and secondary supports relative to said backrest along said longitudinal direction.

8. The method of claim 7 further comprising adjusting a position of at least one of said primary and second supports fore and aft relative to a support surface of said backrest.

9. The method of claim 7 wherein said adjusting said position of said primary support relative to said backrest along said longitudinal direction comprises positioning a lower edge of said primary support below an upper edge of said backrest.

10. The method of claim 1 further comprising rotating said primary support about a laterally extending axis lying substantially perpendicular to said longitudinal axis.

11. The method of claim 1 further comprising rotating said secondary support about a laterally extending axis lying substantially perpendicular to said longitudinal axis.

12. The method of claim 11 further comprising rotating said secondary support about a fore-aft axis lying substantially perpendicular to said laterally extending axis.

13. The method of claim 1 wherein said directly supporting said junction at or between said user's occipital bone and C1 vertebrae with said secondary support comprises directly supporting said user's occipital bone.

14. The method of claim 1, wherein the primary support is no wider than 4.5 inches.

15. The method of claim 1, wherein the primary support is square-shaped and has side lengths no greater than 4.5 inches.

16. The method of claim 1, wherein: the primary support includes a rigid layer and a flexible layer connected to the rigid layer; a central region of the primary support is defined where the flexible layer overlays the rigid layer; side regions of the primary support are defined where the flexible layer extends beyond the rigid layer; and the side regions are more flexible than the central region.

17. The method of claim 16, wherein the central region has a width no greater than 1.5 inches and wherein each side region has a width no greater than 1.5 inches.

18. The method of claim 1, wherein: the secondary support includes a central region and side regions laterally spaced from the central region; and the side regions are more flexible than the central region.

19. The method of claim 18, wherein the central region includes a forwardly facing convex surface and the side regions include a forwardly facing concave surface.

20. A body support structure comprising:
a backrest member comprising a support surface shaped and configured to support at least a sacral region of a user's back;
a primary headrest support comprising a primary support surface directly aligned with a centerline of said backrest member along at least a portion of a T1-T6 thoracic region, wherein said primary headrest support is moveable in a longitudinal direction relative to said backrest member along said centerline, and wherein said primary headrest is not wider than 4.5 inches; and
a secondary headrest support comprising a secondary support surface spaced apart from said primary support surface along said centerline of said backrest member at an occipital shelf region, wherein said secondary headrest support is independently moveable relative to said primary headrest support along said centerline, said secondary headrest being no wider than a user's cranium.

21. The body support structure of claim 20 wherein said primary support surface is aligned with a T1-T4 thoracic region.

22. The body support structure of claim 20 wherein said primary headrest support is pivotable about a laterally extending axis lying substantially perpendicular to said longitudinal direction.

23. The body support structure of claim 20 wherein said secondary headrest support is pivotable about a laterally extending axis lying substantially perpendicular to said longitudinal direction.

24. The body support structure of claim 23 wherein said secondary headrest is pivotable about a fore-aft axis lying substantially perpendicular to said laterally extending axis.

25. The body support structure of claim 20 wherein said primary headrest support is translatable relative to said backrest member in a fore and aft direction extending transverse to said support surface of said backrest member.

26. The body support structure of claim 20 wherein said secondary headrest support is translatable relative to said backrest member in a fore and aft direction extending transverse to said support surface of said backrest member.

27. The body support structure of claim 20 wherein said primary headrest support comprises a central region and laterally spaced side regions, wherein said side regions are more flexible than said central region.

28. The body support structure of claim 20 further comprising a seat coupled to said backrest member.

29. The body support structure of claim 20 wherein said backrest member comprises an upper edge, and wherein said primary support is moveable to a position wherein a lower edge of said primary support is positioned below said upper edge of said backrest member.

30. The body support structure of claim 20 wherein said secondary support is positioned to directly support said user's occipital bone.

31. A bi-level headrest for a user having an occipital bone and a pair of scapulae, the bi-level headrest comprising:
a support structure;
a primary headrest support coupled to said support structure and comprising a primary support surface defining a centerline of said primary headrest support, said primary support surface having a width smaller than a spacing between the user's scapulae, wherein said primary headrest support is positionable along at least a portion of a T1-T6 thoracic region of a user, said centerline extending in a longitudinal direction; and
a secondary headrest support coupled to said support structure and comprising a secondary support surface spaced apart from said primary support surface along said longitudinal direction, the secondary support surface having a surface area smaller than the user's occipital bone, wherein said secondary headrest support is positionable at an occipital shelf region of the user, wherein both of said primary and secondary headrest supports are independently moveable relative to the other thereof along said longitudinal direction.

32. The bi-level headrest of claim 31 wherein said primary headrest support is positionable along at least a T1-T4 thoracic region of a user.

33. The bi-level headrest of claim 31 wherein said primary headrest support is pivotable about a laterally extending axis lying substantially perpendicular to said longitudinal direction.

34. The bi-level headrest of claim 31 wherein said secondary headrest support is pivotable about a laterally extending axis lying substantially perpendicular to said longitudinal direction.

35. The bi-level headrest of claim 34 wherein said secondary headrest support is pivotable about a fore-aft axis lying substantially perpendicular to said laterally extending axis.

36. The bi-level headrest of claim 31 wherein said primary headrest support is translatable in a fore and aft direction extending transverse to said primary support surface.

37. The bi-level headrest of claim 31 wherein said secondary headrest support is translatable in a fore and aft direction extending transverse to said primary support surface.

38. The bi-level headrest of claim 31 wherein said primary headrest support comprises a central region and laterally spaced side regions, wherein said side regions are more flexible than said central region.

39. The bi-level headrest of claim 31 wherein said secondary support is positioned to directly support said user's occipital bone.

40. A method of supporting a user's cranium, the user having an occipital bone and a pair of scapulae, the method comprising:
 adjusting a position of a secondary support in a fore and aft direction transverse to a longitudinal axis, the secondary support including a secondary support surface having a surface area smaller than the user's occipital bone;
 adjusting a position of a primary support in said fore and aft direction transverse to said longitudinal axis independent of said adjusting said position of said secondary support, the primary support including a primary support surface having a width smaller than a spacing between the user's scapulae;
 directly supporting at least a portion of a user's T1-T6 vertebrae with said primary support surface, wherein a spine of said user defines a longitudinal direction when supported by said primary support; and
 directly supporting a junction between said user's occipital bone and C1 vertebrae with said secondary support surface spaced from said primary support along a longitudinal axis extending in said longitudinal direction.

41. The method of claim 40 wherein said directly supporting said junction between said user's occipital bone and C1 vertebrae with said secondary support comprises directly supporting said user's occipital bone.

* * * * *